UNITED STATES PATENT OFFICE 1,970,247

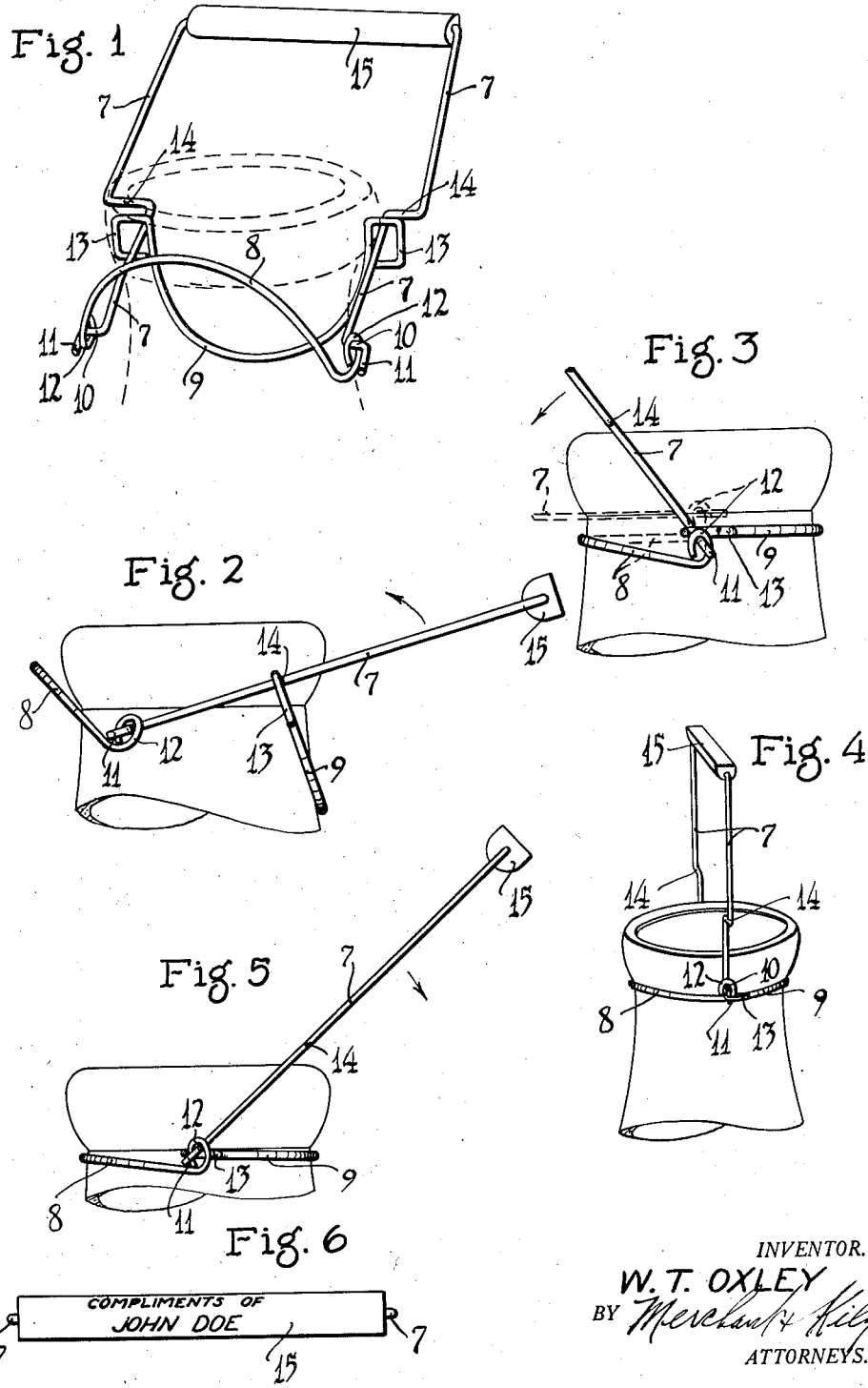

CARRIER

Walter T. Oxley, Fergus Falls, Minn.

Application January 19, 1934, Serial No. 707,297

5 Claims. (Cl. 215—100)

My invention provides an extremely simple and highly efficient bottle carrier, especially adapted for carrying of milk bottles individually from the store or place of purchase to the home. The improved device is of such simple structure that it may be made from three pieces of wire and at such small cost that the device may, in many instances, be given away with the milk bottles without any appreciable loss of profit, or may be advantageously used for advertising purposes and given away with the name of the giver or his advertisement applied thereto. The device may be very quickly applied to the neck of a milk bottle, when applied thereto will securely hold the milk bottle against accidental dropping, and when the milk bottle is delivered, may be quickly detached therefrom and, of course, used over and over again.

The device is herein designated as a milk bottle carrier, but, of course, may be used to carry other bottles or devices that are provided with neck or end portions to which the carrier is adapted to be applied.

A commercial form of the device is illustrated in the accompanying drawing wherein like characters indicate like parts throughout the several views.

Referring to the drawing:

Fig. 1 is a perspective showing the carrier and illustrating the initial step in the application thereof to a milk bottle, the neck portion of which latter is shown by dotted lines;

Fig. 2 is a side elevation of the parts shown in Fig. 1, illustrating very much the same positions of the parts that are illustrated in Fig. 1;

Fig. 3 is a view corresponding to Fig. 2, but illustrating the manner in which the device is clamped to the bottle neck;

Fig. 4 is a view showing the carrier applied and interlocked to the bottle neck;

Fig. 5 is a view corresponding to Figs. 2 and 3, but illustrating a position of the bail in which the device is about to be unlocked and released; and Fig. 6 is a plan view looking at the top of the carrying bail.

The complete carrier comprises three wire elements, to wit: a carrying bail 7, and two clamping yokes 8 and 9, both of which yokes, as shown, are of approximately semi-circular form.

The bail 7, at its ends, is formed with outturned trunnions 10, from the ends of which tripping fingers 11 project as extensions of the sides of the bail. The clamping yoke 8, at its ends, is formed with eyes 12 that are offset from the plane of the bail and are turned into planes that are approximately parallel. These eyes 12 are pivoted on the trunnions 10 of the bail with the trip fingers 11 outside of the said eyes.

The bail 9 is slidably and pivotally mounted on the sides of the bail, this connection being formed by eyes 13 that are much larger than the eyes 12 and are adapted to be forced over the latter. The eyes 13 are turned outward in the plane of said bail 9. The sides of the bail 7, at their intermediate portions, are preferably offset at 14 to limit the upward sliding movements of the yoke 9 thereon. In some instances, the transverse or handle portion of the bail 7 may be provided with an enlarged hand-piece such as a wooden or metallic member 15 through which the wire of said bail is passed before it is bent to final form. Such a hand-piece 15 may be flattened on its top so that it is adapted to receive advertising matter or the name of the giver or other person who is dispensing the same.

The operation of the carrier described is as follows: The device is first applied substantially as shown in Figs. 1 and 2. Then the bail is turned, in respect to Fig. 3, in the direction of the arrow there indicated, until the sides of the bail, by engagement with the forward portions of the eyes 13 have forced said eyes over the relatively small eyes 12 of the yoke 8. When the said bail has been forced toward the left or in the direction of the arrow, a little farther than shown in Fig. 3, the eyes 13 will be forced completely over the eyes 12 and the two clamping yokes 8 and 9 will be interlocked together and tightly gripped around the neck of the bottle below the upper end thereof. When this interlocking of the yokes has taken place, the bail can be moved to its vertical position shown in Fig. 4, and in fact, can be swung to considerable angles in either direction from said upright position without unlocking the yokes from the bottle.

When it is desired to detach the carrier from the bottle, the bail will be turned to the position shown in Fig. 5, and in fact, a little farther in the direction of the arrow marked on said figure, thereby causing the tripping fingers 11 to engage the front portions of the eyes 13 and lift the same over the eyes 12, thereby disconnecting the yokes 8 and 9. From the foregoing, it must be evident that this carrier can be very quickly applied to and very quickly disconnected from a milk bottle or the like, and when applied to the bottle, will very freely hold the same against accidental dropping. The device affords means whereby not only adults, but children may safely carry milk bottles. Of course, the device may be made from any suitable metal strips but will preferably be made from quite stiff commercial wire such as steel wire, that has sufficient stiffness to maintain its proper form.

What I claim is:

1. A carrier of the kind described comprising a bail having at the ends of its arms laterally projecting trunnions that terminate in radially projecting trip fingers, a clamping yoke having laterally projecting eyes pivoted on said trunnions, and a second yoke having eyes slidably mounted on the sides of said bail, said eyes being of such size that they may be carried over and interlocked to the eyes of the first noted yoke, by oscillatory movements of the said bail in one direction, said tripping fingers by a reverse oscillatory movement of said bail being engageable with the relatively large eyes of said second noted yoke to disconnect the said clamping yokes.

2. A carrier of the kind described comprising a carrying bail having at the ends of its arms outstanding trunnions terminating at their outer ends in radially projecting trip fingers, a clamping yoke provided with eyes that are pivoted on said trunnions and are projected from the plane of said yoke into planes parallel to each other, and a second yoke having eyes that are projected outwardly in the plane of said yoke and are slidable on the sides of said bail, said last noted eyes being of such size that they may be carried over and interlocked to the eyes of said first noted yoke by oscillatory movement of said bail in one direction, said tripping fingers under oscillatory movements of the bail in a reverse direction being engageable with the eyes of said second noted yoke to unlock and disconnect said clamping yokes.

3. The structure defined in claim 1 in which the sides of said bail are provided with offset intermediate portions limiting the sliding movement of said second noted yoke on said bail.

4. The structure defined in claim 2 in which the sides of said bail are provided with offset intermediate portions limiting the sliding movement of said second noted yoke on said bail.

5. The structure defined in claim 1 in which the handle portion of said bail is covered by an enlarged hand-piece flattened for the application of advertising matter or the like thereto.

WALTER T. OXLEY.